(12) United States Patent
Hibi

(10) Patent No.: US 6,248,039 B1
(45) Date of Patent: Jun. 19, 2001

(54) TOROIDAL CONTINUOUSLY VARIABLE TRANSMISSION

(75) Inventor: Toshifumi Hibi, Yokosuka (JP)

(73) Assignee: Nissan Motor Co., Ltd., Tokyo (JP)

( * ) Notice: Subject to any disclaimer, the term of this patent is extended or adjusted under 35 U.S.C. 154(b) by 0 days.

(21) Appl. No.: 09/337,512

(22) Filed: Jun. 22, 1999

(30) Foreign Application Priority Data

Jun. 29, 1998 (JP) .................................................. 10-182035

(51) Int. Cl.⁷ .................................................. F16H 15/26
(52) U.S. Cl. .................................................. 476/40
(58) Field of Search .................................. 476/40, 42

(56) References Cited

U.S. PATENT DOCUMENTS

| | | | |
|---|---|---|---|
| 5,027,668 | * 7/1991 | Nakano | 476/41 X |
| 5,230,670 | * 7/1993 | Hibi | 476/42 X |
| 5,299,988 | * 4/1994 | Fukushima et al. | 476/42 |
| 5,368,529 | * 11/1994 | Machida | 476/42 |
| 5,779,591 | * 7/1998 | Inoue | 476/42 |
| 5,971,886 | * 10/1999 | Yamamoto | 476/42 X |
| 6,045,481 | * 4/2000 | Kumagai | 476/42 X |
| 6,071,210 | * 6/2000 | Kato et al. | 476/42 |

FOREIGN PATENT DOCUMENTS

| | | |
|---|---|---|
| 7-249423 | 9/1995 | (JP) . |
| 10-26201 | 1/1998 | (JP) . |

* cited by examiner

Primary Examiner—Rodney H. Bonck
(74) Attorney, Agent, or Firm—Foley & Lardner

(57) ABSTRACT

An input disk (19) of a toroidal continuously variable transmission (19) is connected to a rotation shaft (3) via a ball spline structure. Plural power rollers gripped between the input disk (19) and an output disk (20) are disposed at a predetermined angular interval around the rotation shaft (3). A group or groups of spline units (21) forming the ball spline structure respectively comprise pairs of spline grooves (21A) and balls (21B) held inside these grooves. The input disk (19) exerts a thrust load on the power rollers (30) and their reaction force causes the input disk (19) to deform. By forming the ball spline structure from a group or groups of the spline units (21) in which the spline units (21) are disposed at the same angular interval as the power rollers (30),this deformation is prevented from causing the rotation shaft to suffer rotational vibration.

2 Claims, 5 Drawing Sheets

TOROIDAL CONTINUOUSLY VARIABLE TRANSMISSION

FIELD OF THE INVENTION

This invention relates to a toroidal continuously variable transmission installed mainly in vehicles.

BACKGROUND OF THE INVENTION

Tokkai Hei 10-26201 published by the Japanese Patent Office in 1998 discloses a toroidal continuously variable transmission.

This toroidal continuously variable transmission comprises an input disk connected to a rotation shaft via a ball spline, an output disk facing the input disk, and plural power rollers gripped between these disks.

The power rollers transmit a rotation of the input disk to the output disk. By varying the contact points between the power rollers and the disks, a rotation speed ratio of the input disk and output disk, i.e., the speed ratio of the continuously variable transmission, is made to vary.

For this reason, the input disk and output disk must always be in contact with the power rollers with a predetermined frictional force.

A cam flange and cam rollers are provided for this purpose. The cam flange is supported free to rotate on the rotation shaft and, according to the relative rotational displacement of the cam flange and input disk, the cam rollers exerts a thrust load on the input disk.

SUMMARY OF THE INVENTION

When a rotational torque is transmitted from the input disk to the output disk, a large grip force acts on the power rollers due to the aforesaid thrust load. On the other hand a reaction in the reverse direction to the grip force acts on the input disk and output disk at the contact point with the power rollers, and due to this reaction force, the input disk and output disk deform in such a direction that their outer circumferences separate.

This deforming force causes a load to act both in radial and axial directions on the rotation shaft.

The ball spline which joins the rotation shaft to the input disk comprises a plural spline units. Each spline unit comprises a pair of spline grooves formed on both the input disk and rotation shaft, and plural balls held therein.

In an intermediate part between adjacent spline units, the inner circumference of the input disk and the outer circumference of the rotation shaft are in close proximity separated by a small gap, or are in direct contact under a weak contact pressure. Therefore, of the radial load supporting force of the spline units and the radial load supporting force of the intermediate part, the former is far larger. This difference causes a difference in the deformation state of the input disk. In other words, when there is a spline unit situated at the same rotation angle as the contact point of the disk and power roller, the deformation of the input disk is small, but when there is an intermediate part situated at the same rotation angle as the contact point of the disk and power roller, the deformation of the input disk is large.

Here, when the number of contact points of the disk and power rollers is equal to the number of power rollers, and when there is a spline unit at the same angle as one of the two contact points while there is an intermediate part at the same angle as another contact point, the deformation of the input disk varies irregularly depending on the rotation angle, and this irregular variation causes rotational vibration.

The same problem occurs regarding the deformation of the output disk when the output disk is connected to the rotation shaft by a ball spline.

It is therefore an object of this Invention to control the deformation of the disks of a toroidal continuously variable transmission which are connected to a rotation shaft via a ball spline, to a desirable state.

In order to achieve the above object, this invention provides a toroidal continuously transmission comprising a rotation shaft, an input disk disposed coaxially with the rotation shaft, an output disk disposed coaxially with the rotation shaft, power rollers disposed at a predetermined angular interval around the rotation shaft and gripped between the input disk and the output disk, a ball spline structure consisting of a group or groups of ball spline units for connecting the rotation shaft and either of the input disk and the output disk. Each ball spline unit comprises a pair of spline grooves and a ball gripped therein and each of the group or groups consists of ball spline units which are disposed at an angular interval equal to the predetermined angular interval.

The details as well as other features and advantages of this invention are set forth in the remainder of the specification and are shown in the accompanying drawings.

DESCRIPTION OF THE PREFERRED EMBODIMENTS

Figure 1:
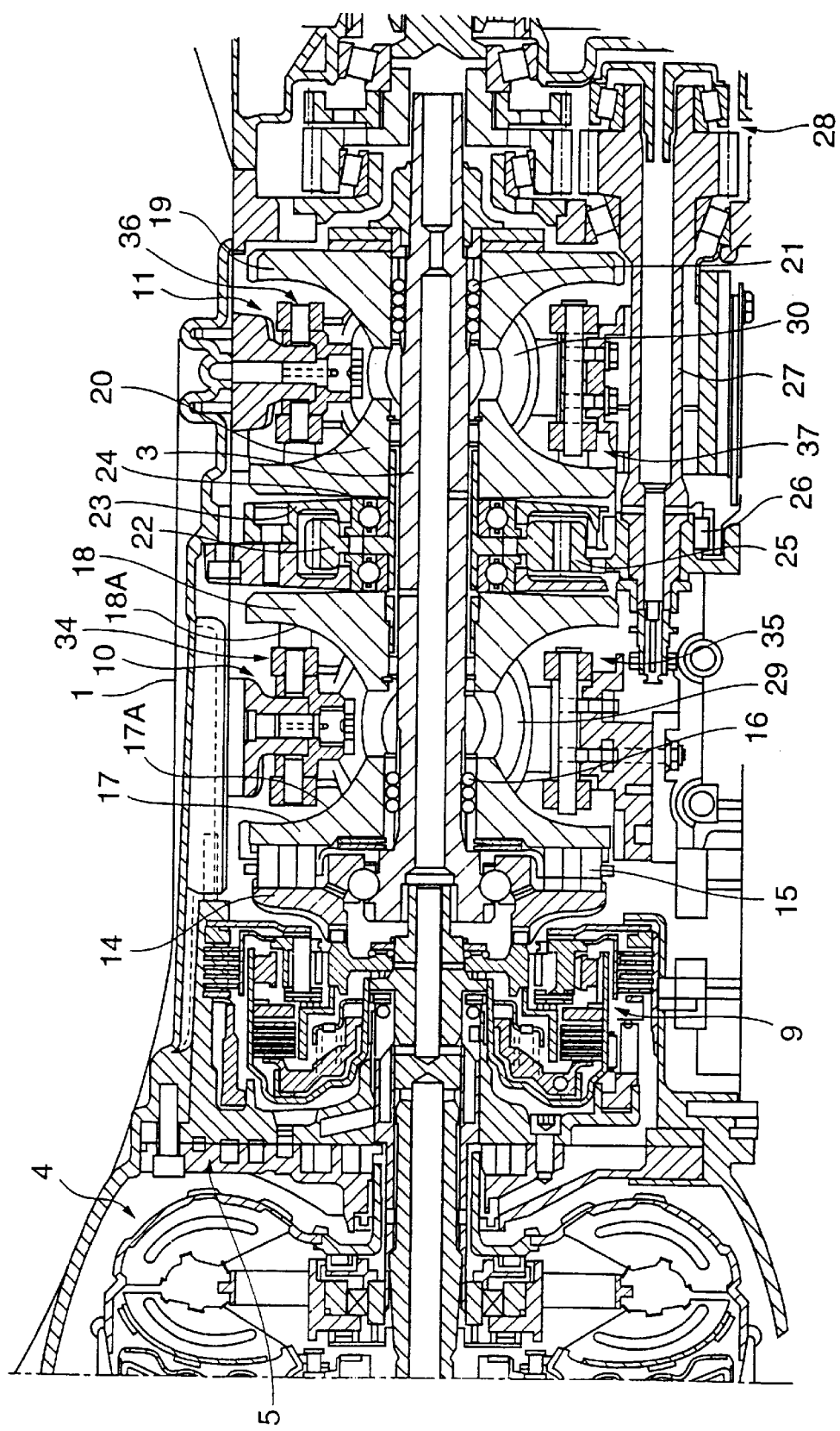
FIG. 1 longitudinal-sectional view of a toroidal continuously variable transmission according to this invention.

Referring to FIG. 1 of the drawings, a toroidal continuously variable transmission is provided with first and second toroidal units 10, 11 arranged in series in a transmission case 1.

The rotation of an engine is transmitted to a cam flange 14 via a torque converter 4, oil pump 5, and forward/reverse change-over mechanism 9.

The cam flange 14 is supported free to rotate via an angular bearing 44 on a rotation shaft 3.

The fist toroidal unit 10 comprises an input disk 17 and output disk 18. and the second toroidal unit 11 comprises an input disk 19 and output disk 20.

The input disk 17 of the first toroidal unit 10 is connected to a base end of the rotation shaft 3 via a ball spline structure comprising plural spline units 16. The input disk 19 of the second toroidal unit 11 is connected to the tip of the rotation shaft 3 via a ball spline structure comprising plural ball spine units 21. These ball spline structures lock the rotation of the input disks 17. 19 respectively relative to the rotation shaft 3, while permitting an axial displacement of the input disks 17, 19 within predetermined limits along the rotation shaft 3

Cam rollers 15 are disposed between the above-mentioned cam flange 14 and the input disk 17 of the first toroidal unit 10. The cam rollers 15 have their own rotation shafts which are perpendicular to the rotation shaft 3. and each roller component comes in contact with both the cam flange 14 and and input disk 17. The cam rollers 15 suffer a rotational displacement around their rotation shafts according to the relative rotation of the cam flange 14 and input disk 17. exert a thrust load via their cam surfaces on the input disk 17. and press the input disk towards the output disk 18 facing it.

At the same time. the cam rollers 15 make the input disk 17 rotate together with the cam flange 14.

A plate spring 42 which exerts all initial thrust load on the input disk 17 towards the output disk 18 is interposed between the cam flange 14 and input disk 17. The reaction force of the cam roller 15 acts on the cam flange 14. This reaction force presses the input disk 19 towards the output disk 20 via a nut 40 tightened on the tip of the rotation shaft 3 and a plate spring 43 gripped by the nut 40 and input disk 19.

The output disks 18, 20 are engaged on the outer circumference of the rotation shaft 3 such that they are free to rotate.

The input disk 17 and output disk 18 of the first toroidal unit 10 have toroidal shaped wall surfaces 17A, 18A facing each other, and a pair of power rollers 29 are gripped by the wall surfaces 17A, 18A due to the aforementioned thrust load. An identical pair of power rollers 30 are also gripped between the a input disk 19 and output disk 20 of the second toroidal unit 11. The rotation of the input disks 17, 19 is transmitted to the output disks 18, 20 via these power rollers 29, 30.

The rotation of the output disks 18 and 20 is transmitted to an output shaft, not shown, via an output gear 22, gear 25, counter shaft 27 and gear 28.

The contact points of a power roller 29 (30) with the input disk 17 (19) and output disk 18 (20) vary according to the gyration angle of the power roller 29 The ratio of rotation speeds of the input disk 17 (19) and output disk 18 (20) is determined according to the distances between the contact points and an axis $O_1$, i.e., the center of the rotation shaft 3. This speed ratio is the speed ratio of this toroidal transmission.

Figure 2:
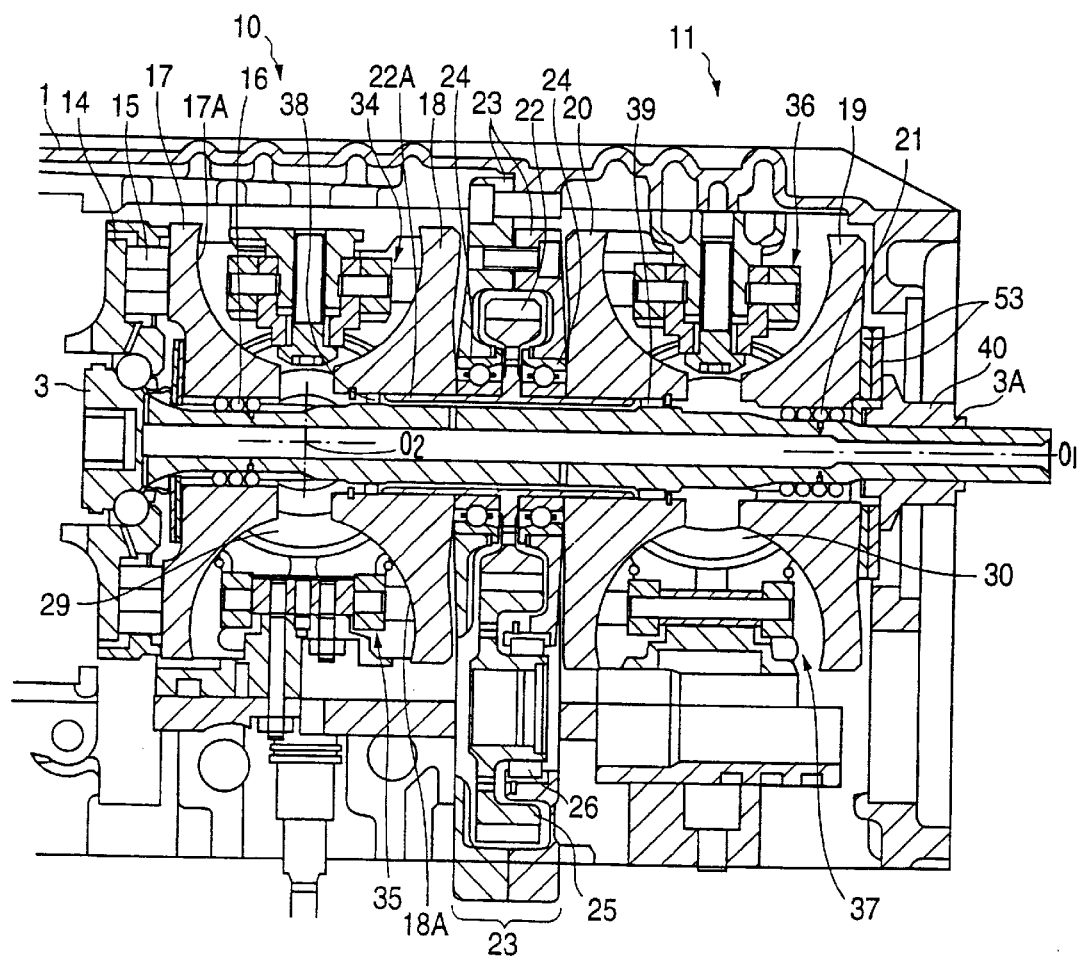
FIG. 2 is a cross-sectional view of the units of the toroidal continuously variable transmission shown in FIG. 1.

Next, the detailed construction of the toroidal units will be described referring to FIG. 2. The following description refers to the second toroidal unit 11, but the construction of the first toroidal unit 10 is identical to that of the second toroidal unit 11 unless otherwise specified.

The second toroidal unit 11 comprises a pair of trunnions which support the power rollers 30. The power rollers 30 are supported by the trunnions via a crank-shaped eccentric shaft. The eccentric shaft comprises a base end supported free to rotate by the trunnions and a tip bent into a crank shape. The power roller 30 is supported by this tip such that it is free to rotate about a rotation axis $O_2$. The power roller 30 is also free to swing around the base of the eccentric shaft within predetermined limits.

The upper parts of the trunnions are connected by an upper link via spherical joints.

The lower parts of the trunnions are also connected by a lower link via spherical joints.

A trunnion shaft is connected to each lower end of the trunnions by a pin.

A boss of a first piston is mounted on the outer circumference of the trunnion shaft of the other of the pair of trunnions and is fixed by a nut. The boss of a second piston is fixed to the outer circumference of the trunnion shaft of the other of the pair of trunnions by the nut.

The pistons are housed in a piston housing. An oil chamber is formed above and an oil chamber is formed below the first piston inside the piston housing. An oil chamber is also formed above and an oil chamber is formed below the second piston.

The same oil pressures are supplied to the oil chambers and the same oil pressures are supplied to the oil chambers. Consequently, the pistons always displace in reverse directions, and due to this displacement, the contacts point between the power rollers 30, input disk 19 and output disk 20 shift. As a result, a rotational force acts on the power roller 30 around its rotation axis. and the trunnions suffer a rotational displacement around the rotation axis. Therefore, the gyration angle of the power roller 30 changes, and the ratio of the rotation speeds of the input disk 19 and output disk 20, i.e., the speed ratio of the continuously variable transmission, varies.

However, the power rollers 30 must always be in contact with these disks 19 and 20 so that the power rollers 30 can transmit a rotational torque from the input disk 19 to the output disk 20. Likewise, the power rollers 29 of the first toroidal unit 10 must always be in contact with the input disk 17 and output disk 18.

To ensure this contact, the thrust load due to the cam rollers 15 is made to act on the input disks 17 and 19.

Next, the deformation of the input disk 19 will be described under the action of this thrust load while referring to FIG. 3.

The thrust load due to the cam rollers 15 acts on the input disk 19 of the second toroidal unit 11 via the nut 40 and a plate spring 43. The cam rollers 15 exert a thrust load directly on the input disk 17 of the first toroidal unit 10.

The point of action of the thrust load that the plate spring 43 exerts on the input disk 19 here is near the axis $O_1$, and the point of action of the thrust load which the cam rollers 15 exert on the input disk 17 is comparatively far from the axis $O_1$.

Figure 3:
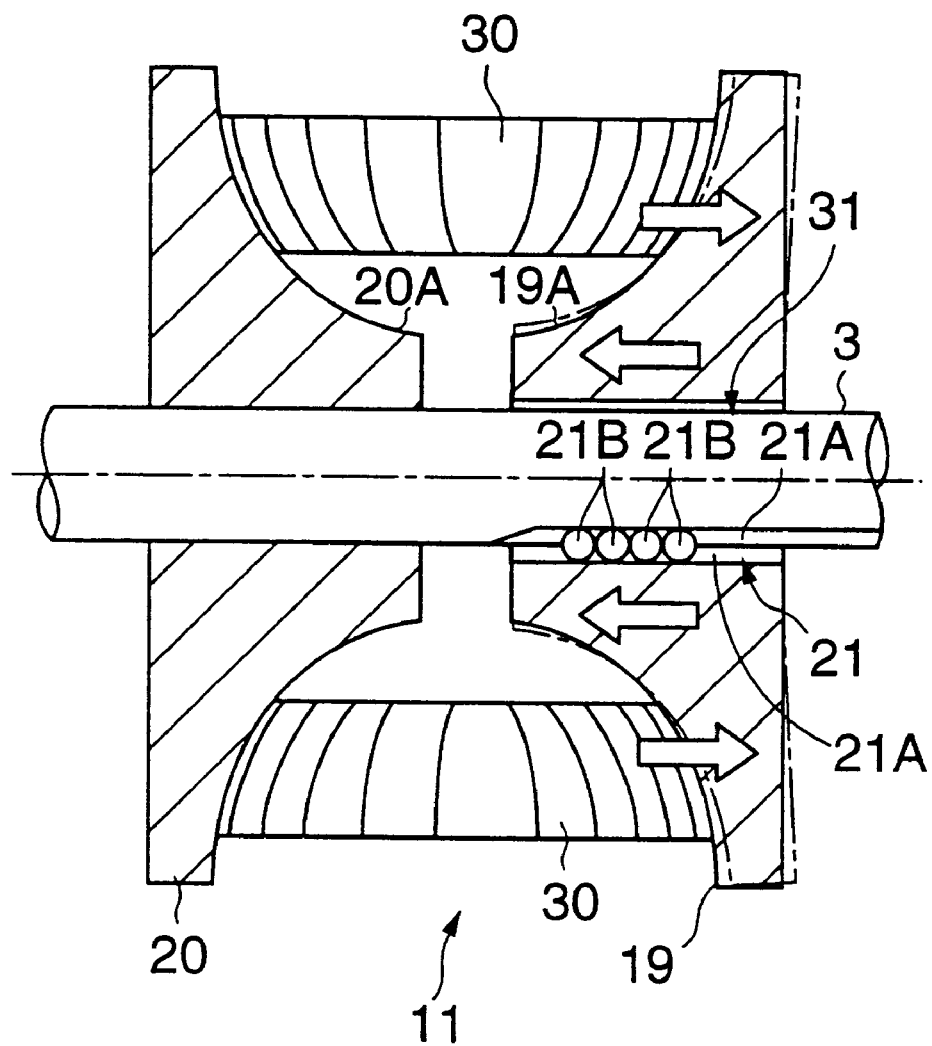
FIG. 3 is a schematic longitudinal sectional view of toroidal speed change unit for the purpose of describing a thrust load acting on an input disk.

Therefore, in the second toroidal unit 11, the points of action of the reaction force exerted by the power rollers 30 on the input disk 19 are further away from the axis $O_1$ than the points of action of the thrust load acting on the input disk 19, as shown by the arrow in FIG. 3.

Due to the difference in the points of action of these forces, a moment causing a deformation acts on the input disk 19 as shown by the dotted line in the figure. Due to this moment, the input disk 19 exerts a radial load on the rotation shaft 3. This radial load is supported by the ball spline structure comprising plural ball spline units 21.

Each ball spline unit 21 comprises a pair of spline grooves 21A formed in corresponding positions on the outer circumference of the rotation shaft 3 and the inner circumference of the input disk 19, and plural balls 21B housed in these grooves 21A.

In an intermediate part 31 between a spline unit 21 and the adjacent spline unit 21, the outer circumference of the rotation shaft 3 and the inner circumference of the input disk 19 are in close proximity separated by a small gap, or come in contact under a weak pressure.

This situation is shown in the upper part of FIG. 3.

It should be noted however that this figure has been drawn for explanatatory purpose only and despite the fact that spline grooves 21A appear only in the lower half of the figure, the ball spline units 21 of this continuously variable transmission are in reality disposed in symmetrical positions around the center of the rotation shaft 3.

The radial load that the input disk 19 exerts on the rotation shaft 3 when the reaction force is exerted on the input disk 19, is supported mainly by plural balls 21B in the spline groove 21A. When this radial load acts on an intermediate part 31 between a spline unit 21 and an adjacent spline unit 21, the intermediate part 31 merely transmits this radial load to the balls 21B of the spline units 21 on both sides, and it does not itself have a structure capable of supporting this radial load. Therefore, the deformation of the input disk 19 is greater when the intermediate part 31 is situated at the same rotation angle as the point of action of the reaction force than when the spline unit 21 is situated at the same rotation angle as the point of action of the reaction force.

Figure 4A:
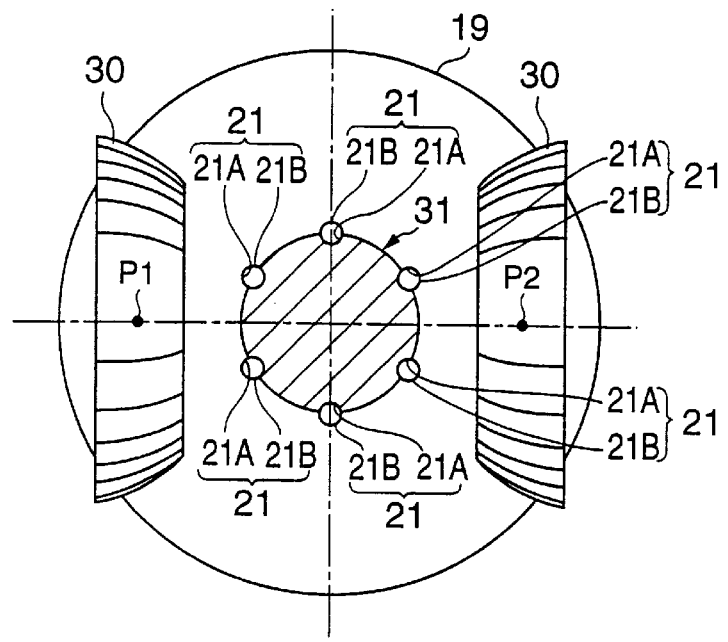
FIGS. 4A and 4B are schematic cross-sectional views of the continuously variable transmission describing a positional relationship between a point of action of a thrust load relative to an input disk and a spline unit according to this invention.
Figure 4B:
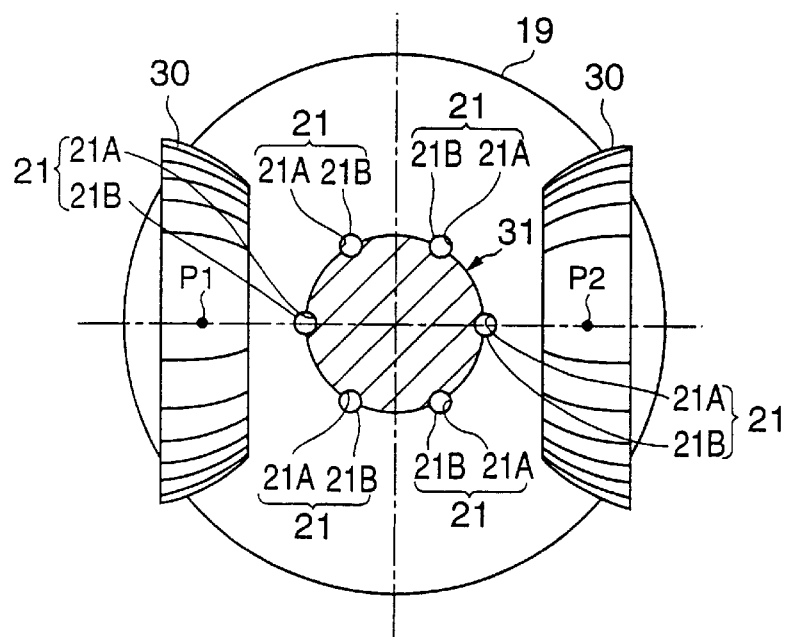

In this continuously variable transmission, the spline grooves 21A are formed at six positions at an equal interval on the outer circumference of the rotation shaft 3 and the inner circumference of the input disk 19 as shown in FIGS. 4A and 4B, and the plural balls 21B are disposed in each of these spline grooves 21A as shown in FIG. 3. In other words, six of the spline units 21 are provided, which is three times the number of the power rollers 30 (two).

The pair of power rollers 30 and input disk 19 come in contact at two points $P_1$, $P_2$ as shown in FIG. 4A. Therefore, the reaction force which the power rollers 30 exert on the input disk 19 acts at these points $P_1$ and $P_2$.

In FIG. 4A, the intermediate part 31 is situated at the same rotation angle as the points $P_1$ and $P_2$.

On the other hand, when the input disk 19 rotates to a position shown in FIG. 4B, the spline unit 21 is situated at the same rotation angle as the points $P_1$ and $P_2$.

Therefore, in this continuously variable transmission, the deformation of the input disk 19 within an angular range of 180 degrees centered on the contact point $P_1$ is always symmetrical with the deformation of the input disk 19 within an angular range of 180 degrees centered on the contact point $P_2$. As a result, the deformation of the input disk 19 varies regularly within a predetermined angular interval.

Compared to the case when the input disk 19 deforms irregularly, the vibration caused to the rotation shaft 30 is reduced, and scatter in the contact frictional force between the power rollers 30 and input disk 19 is also reduced.

The ball spline units 16 which support the input disk 17 of the first toroidal unit 10 have a similar construction to those of the second toroidal unit 11. In the first toroidal unit 10, the thrust load due to the cam rollers 15 acts more towards the outer circumference of the input disk 17, therefore the reaction force exerted by the power rollers 29 on the input disk 17 does not give rise to such a large radial load as in the second toroidal unit 11. However, even in the first toroidal unit 10, the contact points between the power rollers 29 and input disk 17 shift according to the variation of the gyration angle of the power rollers 29, consequently there is a possibility that, depending on the position of the contact points, the distances between the contact points and the points of action of the thrust load due to the cam rollers 15 will increase.

Therefore, it is desirable that the ball spline units 16 have an identical arrangement to that of the ball spline units 21.

In the above embodiment, the case was described where the input disk and output disk gripped a pair of power rollers, but the same effect may be obtained by applying the same criteria to the case where three or more power rollers are gripped between the input disk and output disk.

Further, in the aforesaid embodiment, all the spline grooves 21A are provided at an equal interval, but the above effect may be obtained by satisfying at least the following conditions.

Let the number of the power rollers 30 be Nn and the number of spline units 21 be Nn Nm (where Nm is an integer).

Let these spline units 21 be divided into plural sets each comprising Nn spline units 21. If the spline units 21 in each set are disposed at a regular interval, the deformation of the input disk 19 is always symmetrical about the center axis $O_1$ of the rotation shaft 3 as described above.

Figure 5:
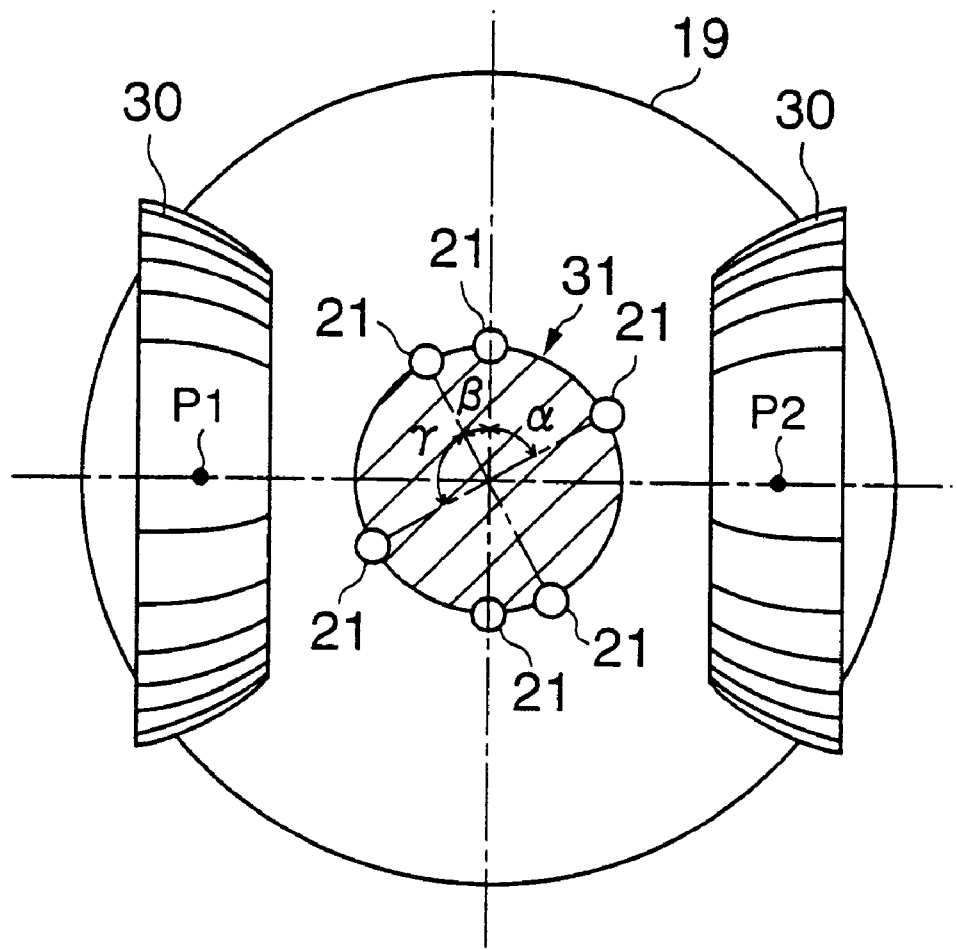
FIG. 5 is a schematic cross-sectional view of a continuously variable transmission according to another embodiment of this invention related to the arrangement of spline grooves.

For example, in FIG. 5, the number Nn of the power rollers 30 is 2, and the number of the spline units 21 is 6. Therefore, Nm is 3. Herein there are three sets of Nn spline units 21 and if the spline units 21 in each set are disposed at an equal regular interval, i.e., 180 degrees in this case, the object of this invention is attained even if the angular intervals α, β, γ between adjacent spline units 21 are not equal.

In other words, the ball spline structure in FIG. 5 comprises three sets of spline units 21 disposed at an angular interval equal to the angular interval of the power rollers 30, i.e., 180 degrees. The angular intervals α, β, γ between each pair and the adjacent pair are not necessarily equal.

Provided that the ball spline structure comprises only the sets of spline units 21 having this relationship, the number of sets may be any number.

The contents of Tokugan Hei 10-182035, with a filing date of Jun. 23, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the above example, the rotation shaft 3 is connected to the input disks 17, 19 via ball splines, however the input disks 17, 19 may be free to rotate relative to the rotation shaft 3, and the output disks 18, 20 joined to the rotation shaft 3 via the ball spines instead. In such a case, this invention may be applied to ball splines supporting the output disks 18, 20.

Further, the above embodiment concerned a double cavity continuously variable transmission comprising a first and second toroidal unit, but it may of course be applied to a single cavity continuously variable transmission comprising a single toroidal unit.

What is claimed is:

1. A toroidal continuously variable transmission comprising:

a rotation shaft;

an input disk disposed coaxially with said rotation shaft;

an output disk disposed coaxially with said rotation shaft;

only two power rollers disposed at a predetermined angular interval around said rotation shaft and gripped between said input disk and said output disk;

a ball spline structure comprising ball spline units that connect said rotation shaft and either of said input disk and said output disk, each ball spline unit comprising a pair of spline grooves and a ball gripped therein, wherein the total number of ball spline units is 2×Nm (Nm>=3), and wherein the ball spline units are arranged at equal angular intervals along a cross-sectional circumference of said rotation shaft.

2. The toroidal continuously variable transmission according to claim 1, wherein the total number of ball spline units is 6.

* * * * *